US010853786B2

(12) United States Patent
Mancini (10) Patent No.: US 10,853,786 B2
(45) Date of Patent: Dec. 1, 2020

(54) MULTI-FACTOR IDENTITY AUTHENTICATION

(71) Applicant: Apple Inc., Cupertino, CA (US)

(72) Inventor: Massimiliano Mancini, San Jose, CA (US)

(73) Assignee: Apple Inc., Cupertino, CA (US)

( * ) Notice: Subject to any disclaimer, the term of this patent is extended or adjusted under 35 U.S.C. 154(b) by 733 days.

(21) Appl. No.: 14/788,315

(22) Filed: Jun. 30, 2015

(65) Prior Publication Data

US 2017/0004482 A1  Jan. 5, 2017

(51) Int. Cl.
*G06Q 20/32* (2012.01)
*G06Q 20/40* (2012.01)
*G06Q 20/42* (2012.01)

(52) U.S. Cl.
CPC ....... *G06Q 20/32* (2013.01); *G06Q 20/40145* (2013.01); *G06Q 20/42* (2013.01)

(58) Field of Classification Search
CPC .... G06Q 20/32; G06Q 20/12; G06Q 20/4014; G06Q 20/322
USPC .......................................................... 705/44
See application file for complete search history.

(56) References Cited

U.S. PATENT DOCUMENTS

| | | | |
|---|---|---|---|
| 2013/0013499 A1* | 1/2013 | Kalgi | G06Q 20/12 705/41 |
| 2013/0297425 A1* | 11/2013 | Wallaja | G06Q 20/322 705/14.64 |
| 2014/0304159 A1 | 10/2014 | Fisher | |
| 2015/0213542 A1 | 7/2015 | Wallaja | |
| 2015/0339666 A1 | 11/2015 | Wilson et al. | |
| 2016/0042341 A1 | 2/2016 | Griffin et al. | |
| 2016/0162882 A1* | 6/2016 | McClung, III | G06Q 20/02 705/41 |
| 2016/0307194 A1* | 10/2016 | Bhatnagar | H04L 63/0838 |
| 2016/0321650 A1* | 11/2016 | Fedak | G06Q 20/12 |
| 2018/0032996 A1* | 2/2018 | Phillips | G06Q 20/325 |

FOREIGN PATENT DOCUMENTS

WO  2015/0124776  8/2015

* cited by examiner

*Primary Examiner* — Namrata Boveja
*Assistant Examiner* — Carol A See
(74) *Attorney, Agent, or Firm* — Kilpatrick, Townsend & Stockton (57) ABSTRACT

Disclosed herein are systems, methods, and non-transitory computer-readable storage media for allowing for payment of transactions initiated with a client device to be completed using a mobile device and requiring multiple-step authentication of the user before completing the transactions.

32 Claims, 7 Drawing Sheets

ND identity authentication.

MULTI-FACTOR IDENTITY AUTHENTICATION

BACKGROUND

Technical Field

The present disclosure relates to authenticating the identity of a user and more specifically to multi-factor identity authentication.

INTRODUCTION

Traditional online payment systems expose users to security risks. For example, typing a credit card number into a field on an online payment form exposes a user to theft of the number by a person looking at their screen, by a keystroke logging virus, etc. Also, storing credit card number by an online retailer can avoid requiring the user to enter the information, but it exposes the online retailer to its own security risks and liability.

Other existing solutions support mobile payments and allows for integration with web sites by enabling an online store to use barcodes to complete payment on a mobile device. However, these solutions do not support notifications or provide validation of what specifically is being purchased.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Systems, methods and non-transitory computer-readable media are disclosed which allow for payment of transactions initiated with a client device to be completed using a mobile device and which require multiple-step authentication of the user before completing the transactions.

Some embodiments of the present technology involve receiving a request to confirm a user identity in an identity service and sending a confirmation, to the commerce server, that the user is the same user of a mobile device having a mobile payment option that is integrated with the commerce server. After receiving a request from the user to perform a payment transaction using the mobile payment option on the mobile device, an identity service can notify the user that the mobile device can be used to complete the payment transaction using the mobile payment option.

Some embodiments of the present technology involve providing a user of an online store an option to pay for a transactions initiated with a client device to be completed using a mobile device. A commerce server can identify a user accessing an online store via a webpage and ask an identity service to determine that the identified user has a mobile device with a mobile payment option that is integrated with the commerce service. After receiving confirmation from the identity service, the commerce server can display an interface element on an online store webpage for purchasing the product via the mobile payment option. Upon a user selecting the interface element, the commerce server can cause a notification to be sent to the mobile device along with a purchase transaction identifier and an application identifier. After receiving a confirmation that mobile payment option has completed a payment transaction that required a user authentication on the user's mobile device, the commerce server can update the webpage on the client device to indicate that the product was purchased.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for allowing payment completion, for transactions initiated on a website, on mobile devices and for integrating transaction data into mobile payment options using notifications. Systems, methods and non-transitory computer-readable media are disclosed which allow for payment of transactions initiated with a client device to be completed using a mobile device and which require multiple-step authentication of the user before completing the transactions.

Figure 1:
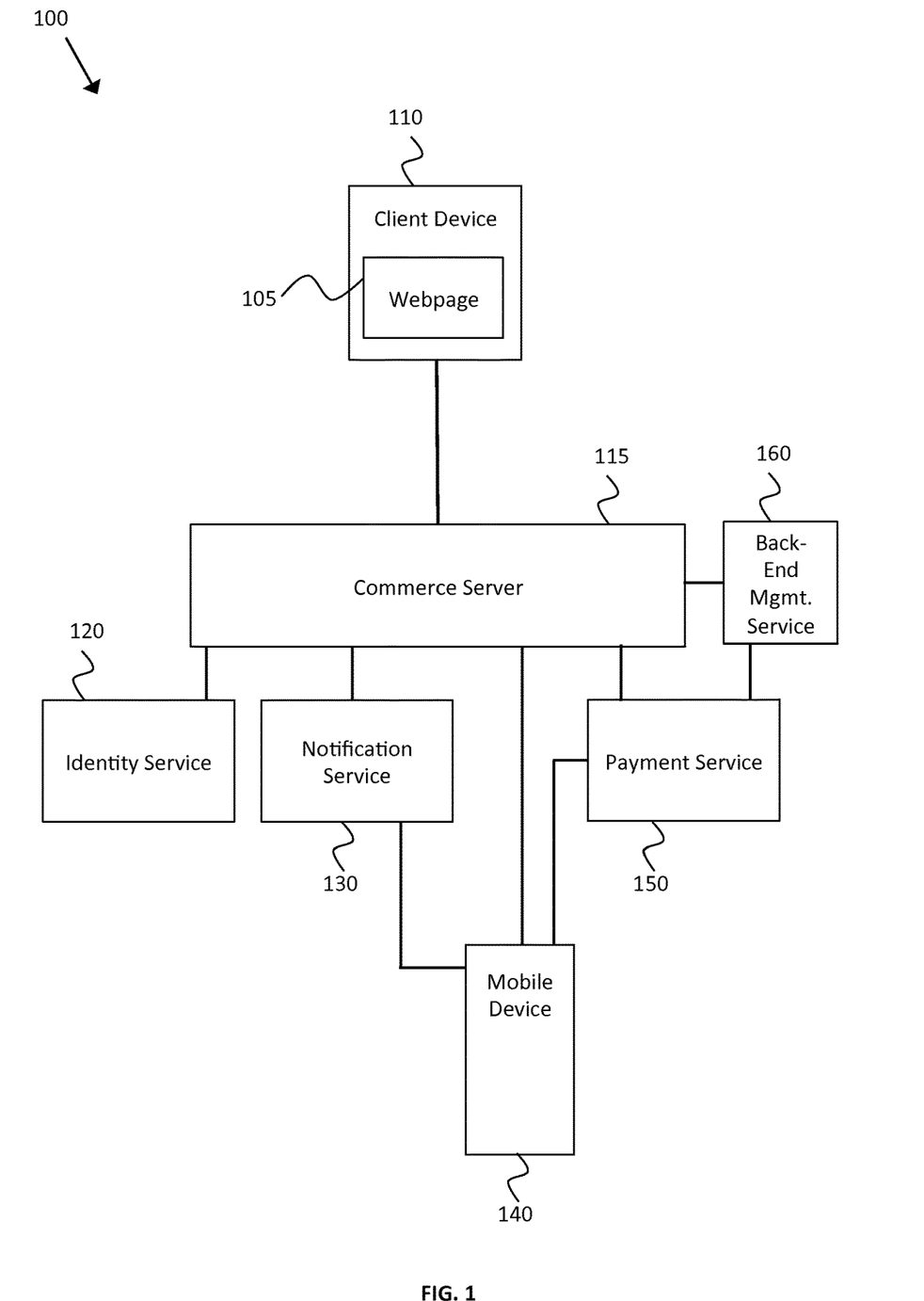
FIG. 1 illustrates an example of a system for performing a multiple-factor authentication of a user's identity and allowing the user to checkout from an online store using a mobile payment service according to some embodiments of the present technology.

FIG. 1 illustrates an example of a system 100 for performing a multiple-factor authentication of a user's identity and allowing the user to checkout from an online store using a mobile payment service. The system 100 includes a commerce server 115 that hosts an online store and a client device 110 accessing the online store via a webpage 105. The commerce server 115 can identify a user accessing the online store via the webpage 105 by the user entering login credentials, the commerce server 115 recognizing a cookie on the client device 110, or other methods of authentication.

The commerce server 115 also communicates with an identity service 120 for determining when to allow the user of the client device 110 to complete a payment transaction with online store via a mobile payment system on a mobile device.

The identity service 120 can receive information from the mobile device 140 describing whether the mobile device 140 has mobile payment options. For example, the identity service 120 can receive information from the mobile device 140 describing a digital wallet application that is executable on the mobile device 140 and that is capable of performing mobile payments. The identity service 120 can also receive information about specific cards within the digital wallet that can be used to make payments either generally (e.g. credit gift card) or with specific vendors (e.g. a coffee shop store card). Similarly, the identity service 120 can receive, from the mobile device 140, information describing standalone (i.e. separate from a digital wallet application) applications that are executable on the mobile device 140 and that are capable of performing mobile payments. For example, the identity service 120 can receive information from the mobile device 140 describing an application specifically designed to interact with a specific online store.

Also, the identity service 120 can receive information from the mobile device 140 describing the identity of the user of the mobile device 140. For example, the identity service 120 can receive, from the mobile device 140, a user identifier associated with the digital wallet application. In some embodiments, the identity service 120 can receive an account identifier for a cloud-based media and services platform that is associated with the mobile device.

The commerce server 115, the identity service 120, or both the commerce server 115 and the identity service 120 can compare the identify a user accessing the online store via the webpage 105 and the identity of the user of the mobile device 140 to determine when it is the same user. For example, when the login credentials of the user logging into an online store on the client device are the same as the login credentials for an application for accessing the online store that is running on the mobile device, then the identity server 120 can determine that the users are the same user.

Additionally, the identity service 120 can receive information from the mobile device 140 describing an additional level of authentication required by the mobile device 140 to perform a mobile payment. For example, the identity service 120 can receive information describing that the mobile device requires biometric authentication before completing a mobile payment. Likewise, the identity service 120 can receive information describing that the mobile device requires a password, entry of a specific pattern, a voice command, etc. before completing a mobile payment.

The commerce server 115 can send the client device instructions for rendering a webpage 105 that allows the user to specify a payment transaction. For example, the webpage 105 can display a shopping cart of items selected for purchase by the user and options for completing a payment transaction to purchase them items in the shopping cart, e.g. credit card information, gift card information, checking account information, etc. When the identity service 120 and/or the commerce server 115 determine that the user of the client device 110 is the same user as the user of the mobile device 140, the commerce server can also update the webpage 105 to include an interface element for allowing the user to complete a payment using a mobile payment option. When the user selects the interface element, the commerce server 115 can send an instruction to the identity server 120 to send a notification to the mobile device 140 that a mobile payment option on the mobile device can be used to complete the payment transaction. In some embodiments, the system 100 also includes a notification service 130 that is used to send a notification to the mobile device 140 after the commerce server 115 verifies that the user selected the interface element on the webpage 105. The notification can be delivered in the form of an email, text message, etc. Preferably, the notification is an interactive notification that is delivered to a notification management center on the mobile device 140 and displayed on the mobile device 140 when the user opts in to receiving notifications from the commerce server 115. For example, the notification can be displayed on a lock screen of the mobile device 140.

In some embodiments of the present technology, the notification includes a payment transaction identifier that identifies the payment transaction in the commerce server 115. For example, the payment transaction identifier can include an identifier that identifies the items stored in the user's shopping cart in the online store. Also, the mobile device 140 (via the digital wallet application, standalone application, etc.) can display an interface showing the items in the shopping cart. In some embodiments of the user can modify the shopping cart on the mobile device 140 and the mobile device 140 (via the digital wallet application, standalone application, etc.) can send an instruction to the commerce server 115 to update the webpage 105 to reflect the modification.

Likewise, the notification can include an application identifier that identifies an application on the mobile device associated with the online store. The mobile device 140 can use the application identifier to locate and/or execute the appropriate application or digital card on the mobile device 140. For example, the notification can include an application identifier that specifies a digital card in the user's digital wallet application (as specified by the identity service) that can be automatically displayed when the user selects the notification. In another example, the application identifier can specify a standalone application (as specified by the identity service) that is specific to the online store that can be automatically displayed when the user selects the notification.

In some embodiments of the present technology, the notification includes one or more merchant identifier for the payment transaction and the mobile device 140 can recognize the merchant identifier and initiate a separate loyalty card protocol with the commerce server 115.

After the mobile device 140 identifies the payment transaction (e.g. receives payment transaction information and displays the shopping cart), the mobile device 140 can complete the payment transaction using one or more mobile payment option. In some embodiments, the mobile device 140 can require an additional level of authentication before completing a payment transaction. For example, the mobile device 140 can require a password, biometric authentication, etc. Likewise, the commerce server 115 can require a confirmation, from the mobile device, that the performed the additional level of authentication before recognizing a payment transaction as being completed. Similarly, the identity service 120 and/or the notification service 130 can require that the mobile device 140 be designated as the user's primary device before sending a notification to the mobile device 140. Likewise, the commerce server 115 can require confirmation that the mobile device 140 is the user's primary device before recognizing a payment transaction as being completed.

After completing the necessary steps to perform a payment transaction, the mobile device 140 can complete the payment transaction with a payment service 150.

In some embodiments of the present technology, a payment service 150 allows a user to add a credit or debit card, without storing the actual card numbers on the mobile device nor on the commerce server. Instead, a unique Device Account Number is assigned, encrypted and securely stored in a secure element on the mobile device. The payment transaction is authorized with a one-time unique number using your Device Account Number and, instead of using the security code from the back of your card, the payment service creates a dynamic security code to securely validate each transaction. As explained in greater detail below, some embodiments of the present technology involve enforcing a privacy policy for securing user information.

The payment service 150 and/or the mobile device 140 can inform the commerce server 115 that the payment transaction has been completed and the commerce server 115 can update the webpage 105 to reflect that the transaction is complete. Additionally, in some embodiments, the payment service 150 and/or the mobile device 140 can inform a backend management server 160 associated with the commerce server 115 that the transaction is complete. In some other embodiments, the commerce server 115 includes an integrated backend management subsystem. A backend management server 160 or subsystem can automatically, upon determining that a purchase transaction is complete, coordinate shipping and tracking, update an inventory management system, schedule routine updates, coordinate customer service items, etc.

Figure 2A:
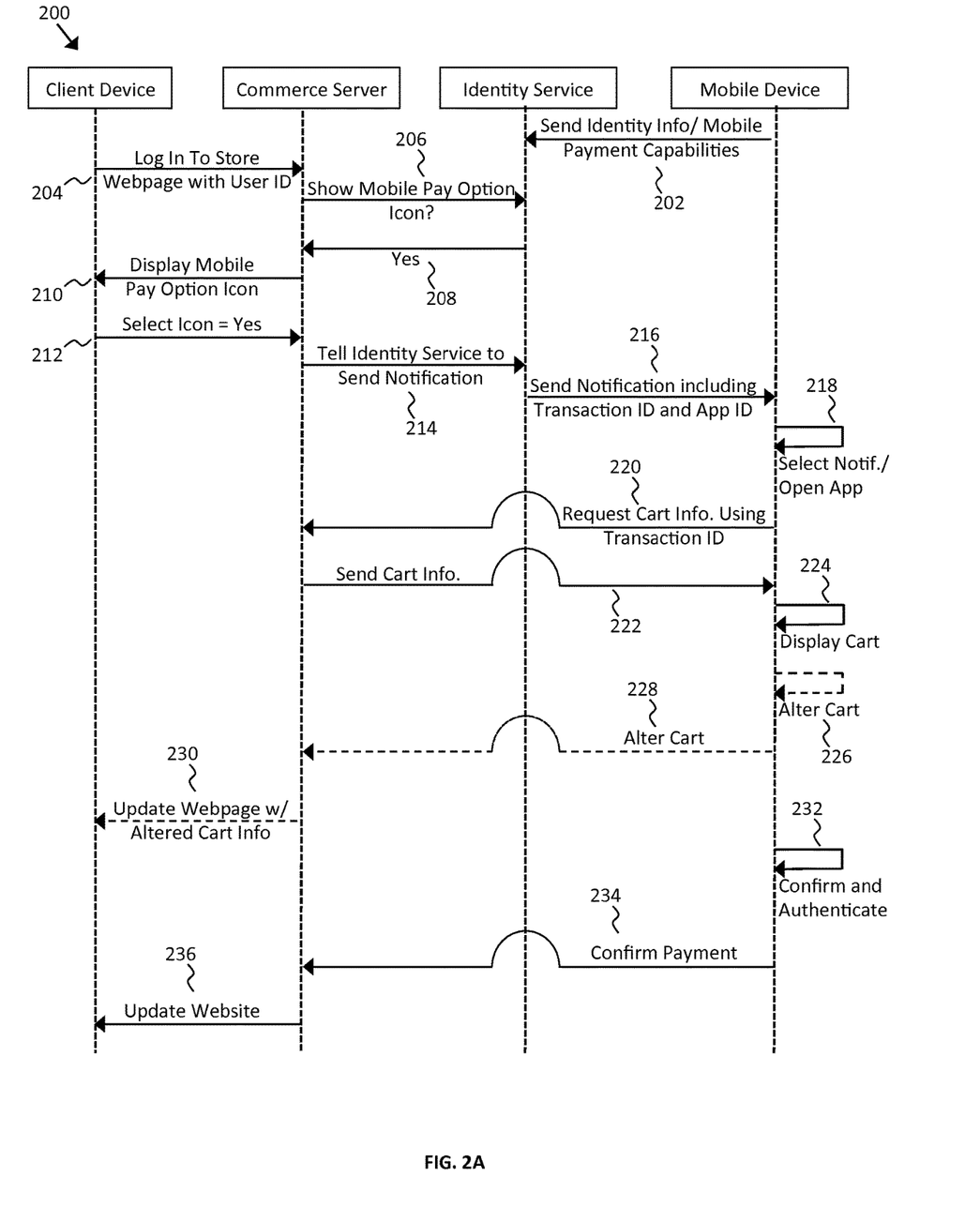
FIG. 2A illustrates a sequence of events performed between a client device, a commerce server, an identity service, and a mobile device to complete a payment transaction using the mobile device and after receiving multiple factors of user authentication according to some embodiments of the present technology.
Figure 2B:
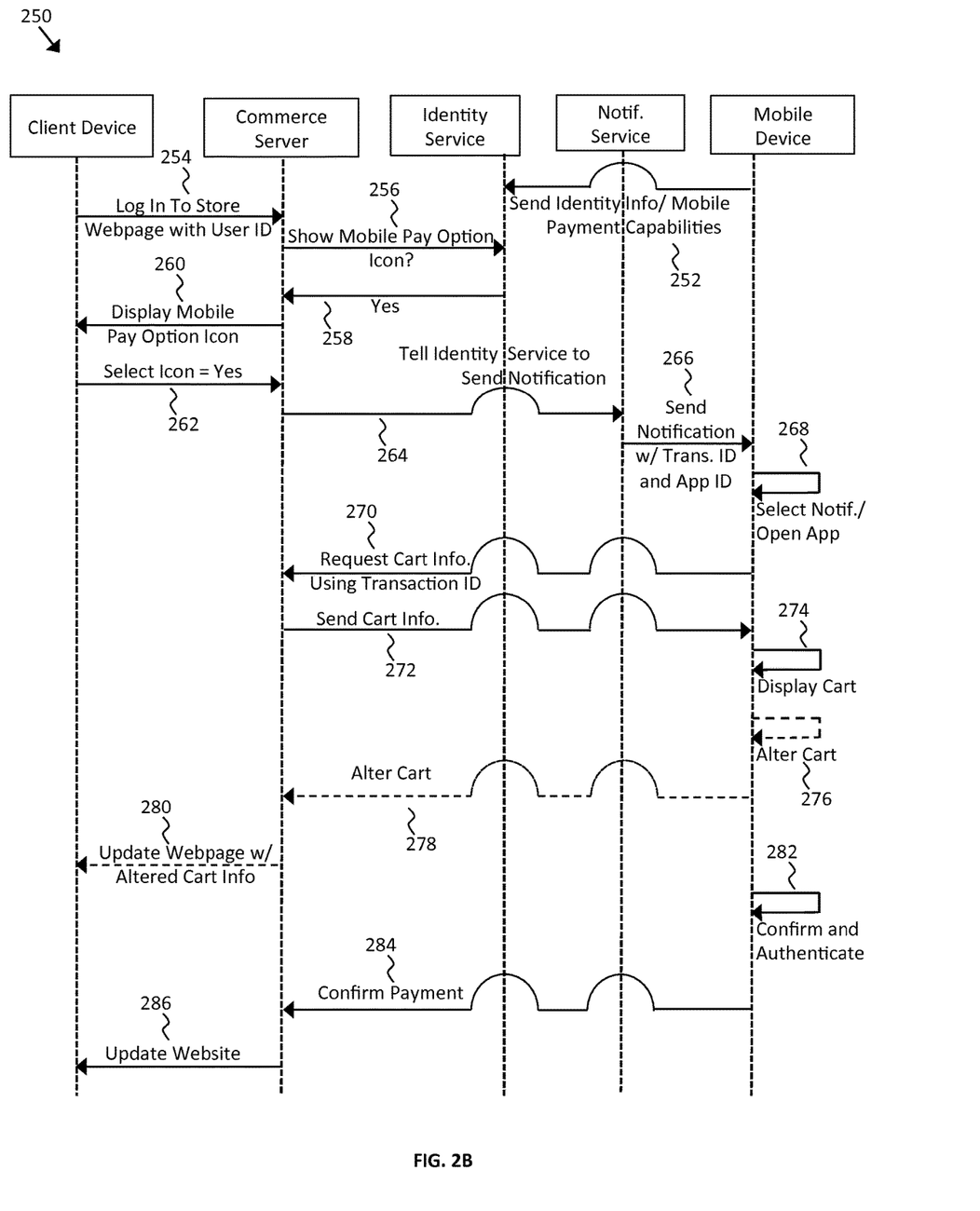
FIG. 2B illustrates another sequence of events performed between a client device, a commerce server, an identity service, and a mobile device to complete a payment transaction using the mobile device and after receiving multiple factors of user authentication according to some embodiments of the present technology.

FIGS. 2A and 2B illustrate sequences of events for allowing for payment of transactions initiated with a client device to be completed using a mobile device and which require multiple-step authentication of the user before completing the transactions according to some embodiments of the present technology.

FIG. 2A illustrates a sequence 200 of events performed between a client device, a commerce server, an identity service, and a mobile device to complete a payment transaction using the mobile device and after receiving multiple factors of user authentication. The sequence 200 can include a mobile device sending an identity service information about the user's identity and mobile payment capability information 202. Step 202 can occur in advance of the rest of the sequence 200. For example, the mobile device can update the identity service when the mobile device first sets up a mobile payment option.

The sequence 200 also involves a user logging into a store webpage with a user identifier 204 and the commerce server requesting, from the identity service, whether or not it should display a mobile pay option icon 206 by virtue of the identity service identifying the user as the user of a mobile device with a mobile pay option. When the identity service responds to the commerce server in the affirmative 208, the commerce server can cause the website shown to the client device to render a mobile pay option icon 210.

Next, the client device can report, to the commerce server, that the user selected the mobile pay option icon 212 and the commerce server can tell the identity service to send a notification to the mobile device 214. The identity service can send a notification to the mobile device 216 that includes a transaction identifier and an application identifier. The transaction identifier can be used to find the user's transaction (e.g. shopping cart of selected items) in the commerce server. The application identifier can be used to tell the mobile device which application to open (e.g. digital wallet, standalone store application, etc.) when the user selects the notification.

The sequence 200 can then involve the user selecting the notification and opening the application specified in the application identifier 218. Next, using the transaction identifier, the mobile device can request shopping cart information from the commerce server 220 and receiving the same 222. The shopping cart information can be displayed 224 in the selected application. Optionally, the sequence 200 can involve the user altering the shopping cart from the mobile device 226, requesting that the commerce server alter the shopping cart 228, and the commerce server updating the webpage displayed on the client device with the altered shopping cart information 230.

Once the user of the mobile device is satisfied with the transaction information (e.g. shopping cart, price, etc.) the sequence 200 can involve a user confirming the payment and authenticating the user 232. For example, confirming payment and authenticating a user can involve requesting biometric authentication from a user, e.g. fingerprint recognition, retina detection, voice authentication, etc. Also, confirming payment and authenticating a user can involve a user entering a password and clicking a payment icon. After the user is authenticated and the payment is confirmed, the sequence 200 can include the mobile device confirming payment with the commerce server 234 and the commerce server updating the website displayed on the client device 236.

FIG. 2B illustrates another sequence 250 of events performed between a client device, a commerce server, an identity service, and a mobile device to complete a payment transaction using the mobile device and after receiving multiple factors of user authentication. The sequence 250 can include a mobile device sending an identity service information about the user's identity and mobile payment capability information 252. Step 252 can occur in advance of the rest of the sequence 250. For example, the mobile device can update the identity service when the mobile device first sets up a mobile payment option.

The sequence 250 also involves a user logging into a store webpage with a user identifier 254 and the commerce server requesting, from the identity service, whether or not it should display a mobile pay option icon 256 by virtue of the identity service identifying the user as the user of a mobile device with a mobile pay option. When the identity service responds to the commerce server in the affirmative 258, the commerce server can cause the website shown to the client device to render a mobile pay option icon 260.

Next, the client device can report, to the commerce server, that the user selected the mobile pay option icon 262 and the commerce server can tell a notification service to send a notification to the mobile device 264. The notification service can send a notification to the mobile device 266 that includes a transaction identifier and an application identifier. The transaction identifier can be used to find the user's transaction (e.g. shopping cart of selected items) in the commerce server. The application identifier can be used to tell the mobile device which application to open (e.g. digital wallet, standalone store application, etc.) when the user selects the notification.

The sequence 250 can then involve the user selecting the notification and opening the application specified in the application identifier 268. Next, using the transaction identifier, the mobile device can request shopping cart information from the commerce server 270 and receiving the same 272. The shopping cart information can be displayed 274 in the selected application. Optionally, the sequence 250 can involve the user altering the shopping cart from the mobile device 276, requesting that the commerce server alter the shopping cart 278, and the commerce server updating the webpage displayed on the client device with the altered shopping cart information 280.

Once the user of the mobile device is satisfied with the transaction information (e.g. shopping cart, price, etc.) the sequence 250 can involve a user confirming the payment and authenticating the user 282. For example, confirming payment and authenticating a user can involve requesting biometric authentication from a user, e.g. fingerprint recognition, retina detection, voice authentication, etc. Also, confirming payment and authenticating a user can involve a user entering a password and clicking a payment icon. After the user is authenticated and the payment is confirmed, the sequence 250 can include the mobile device confirming payment with the commerce server 284 and the commerce server updating the website displayed on the client device 286.

Figure 3:
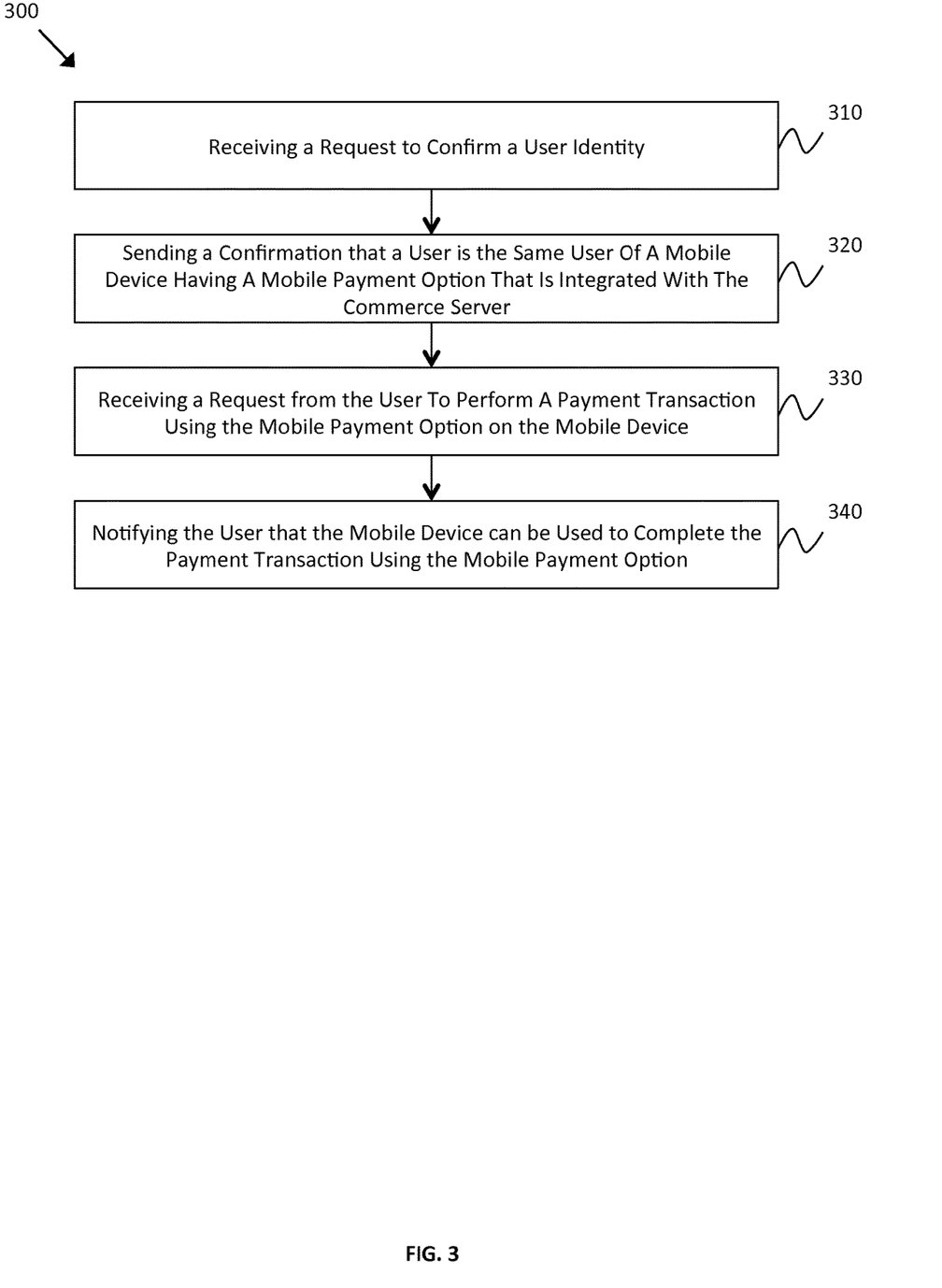
FIG. 3 illustrates a method of allowing for payment of transactions initiated with a client device to be completed using a mobile device by confirming an identity of a user according to some embodiments of the present technology.

FIG. 3 illustrates a method 300 of allowing for payment of transactions initiated with a client device to be completed using a mobile device by confirming an identity of a user according to some embodiments of the present technology. The method 300 involves receiving a request to confirm a user identity 310 in an identity service. Next, the method involves the identity service sending a confirmation, to the commerce server, that the user is the same user of a mobile device having a mobile payment option that is integrated with the commerce server 320.

Next, after receiving a request from the user to perform a payment transaction using the mobile payment option on the mobile device 330, the method involves the identity service notifying the user that the mobile device can be used to complete the payment transaction using the mobile payment option 340. In some cases, notifying the user that the mobile device can be used to complete the payment transaction using the mobile payment option 340 can involve instructing a notification service to send a notification to the mobile device.

Figure 4:
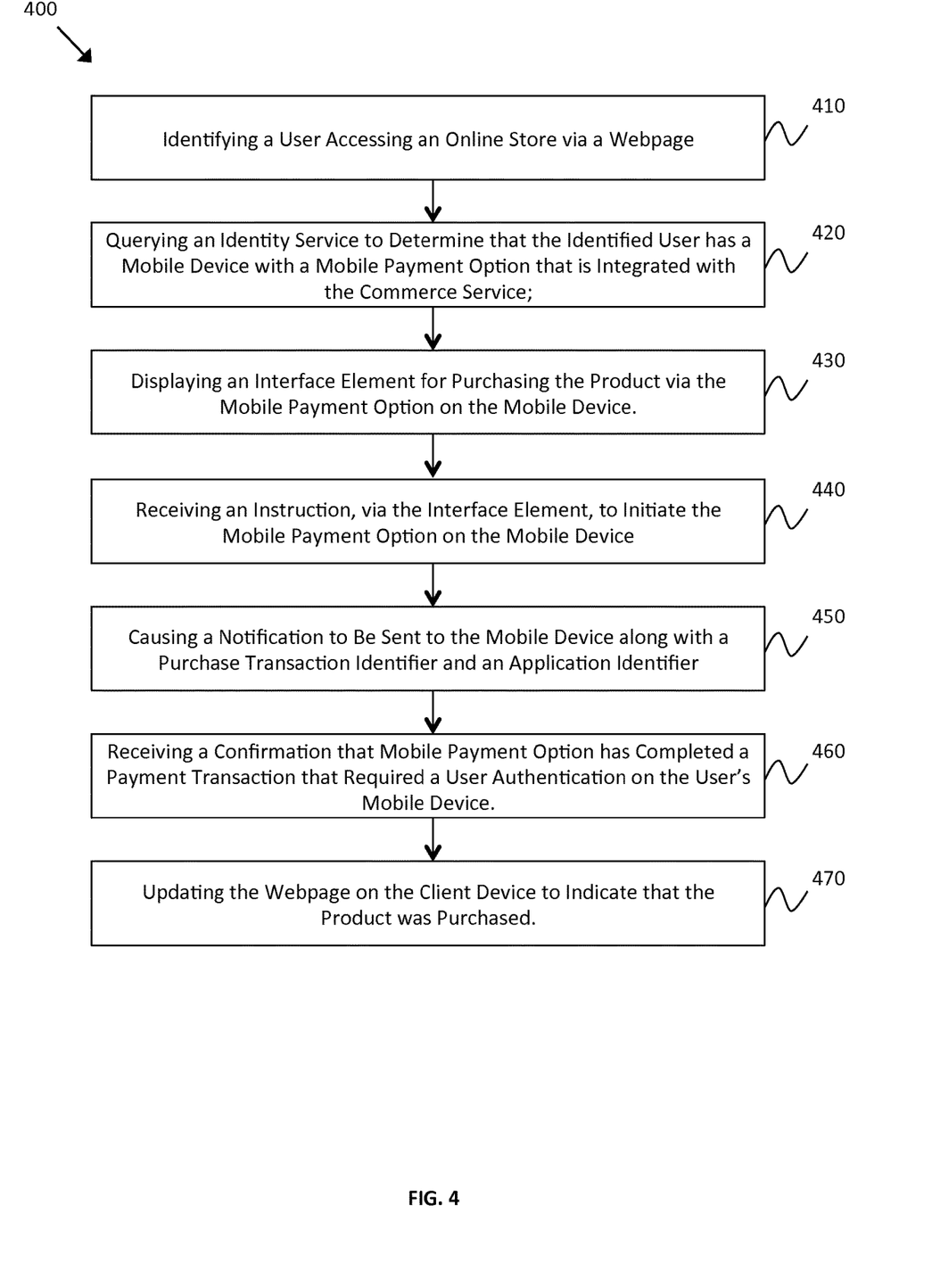
FIG. 4 illustrates a method of providing a user of an online store an option to pay for a transactions initiated with a client device to be completed using a mobile device according to some embodiments of the present technology.

FIG. 4 illustrates a method 400 of providing a user of an online store an option to pay for a transactions initiated with a client device to be completed using a mobile device according to some embodiments of the present technology. The method 400 involves identifying a user accessing an online store via a webpage 410. For example, identifying a user can involve receiving and authenticating login credentials, recognizing a cookie on a client device, etc. Next, the method 400 involves querying an identity service to determine that the identified user has a mobile device with a mobile payment option that is integrated with the commerce service 420.

After receiving confirmation from the identity service, the method 400 involves displaying an interface element on an online store webpage for purchasing the product via the mobile payment option on the mobile device 430. Upon receiving an instruction, via the interface element, to initiate the mobile payment option on the mobile device 440, the method 400 involves causing a notification to be sent to the mobile device along with a purchase transaction identifier and an application identifier 450.

Next, after receiving a confirmation that mobile payment option has completed a payment transaction that required a user authentication on the user's mobile device 460, the method 400 involves updating the webpage on the client device to indicate that the product was purchased 470.

As described herein, one aspect of the present technology is the gathering and use of data available from various sources to improve the delivery of invitational content including, promotions, advertisements, or any other content that may be of interest to users. The present disclosure contemplates that, in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Figure 5A:
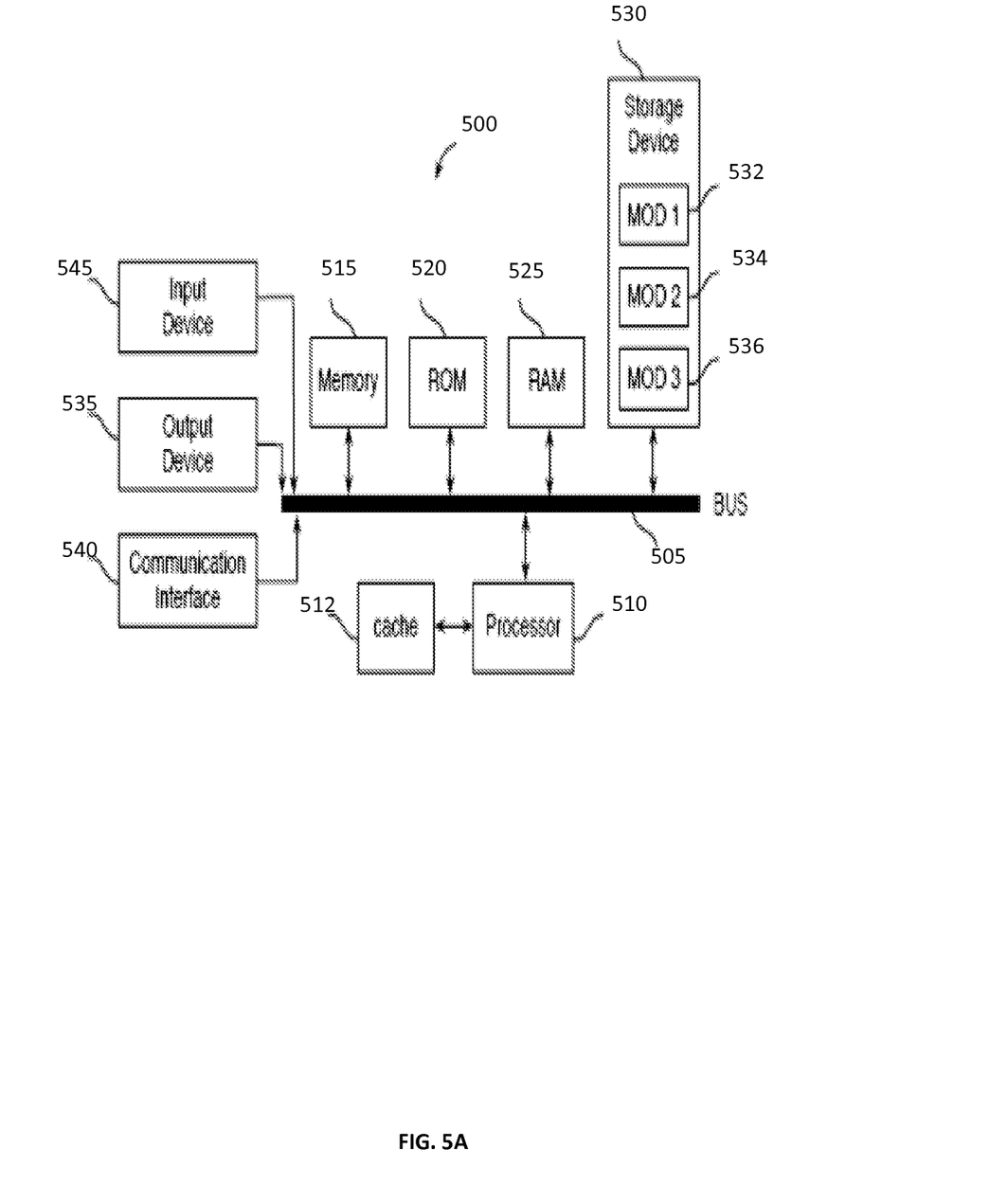
FIG. 5A and FIG. 5B illustrate exemplary possible system embodiments.
Figure 5B:
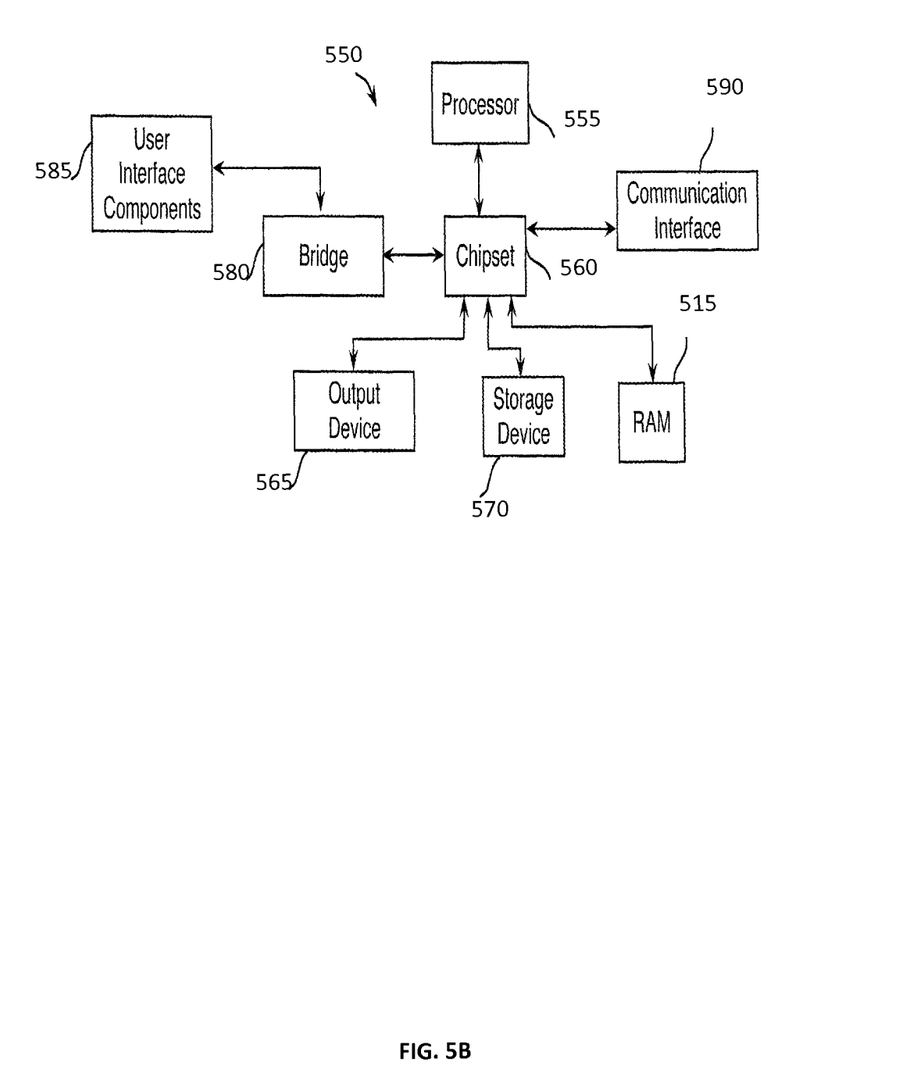

FIG. 5A, and FIG. 5B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

I claim:

1. A method for multi-factor authentication of a client device at a commerce server with a mobile device to limit exposure of the client device to security risks, the method comprising:
   accessing, an online store via a webpage rendered on the client device, wherein the client device has an associated user identifier, the user identifier being the same user identifier of the mobile device having a mobile payment option that is integrated with the commerce server;
   receiving a first update to the webpage to display a selectable interface element to request to purchase a product via the mobile payment option on the mobile device;
   transmitting, from the client device to the commerce server, a request to perform a payment transaction to purchase the product using the mobile payment option on the mobile device;
   receiving, at the client device from the commerce server, a second update to the webpage to display an alteration, requested from the mobile device, to the request to purchase the product; and
   receiving, at the client device, a notification that the mobile device can be used to complete the payment transaction using the mobile payment option,
   whereby the multi-factor authentication of the client device at the commerce server with the mobile device limits exposure of the client device to security risks.

2. The method of claim 1, wherein the notification comprises a payment transaction identifier that identifies the payment transaction in the commerce server.

3. The method of claim 1, wherein the notification comprises an application identifier that identifies an application on the mobile device that is associated with the mobile payment option.

4. The method of claim 1, wherein the receiving, at the client device, the notification that the mobile device can be used to complete the payment transaction using the mobile payment option comprises:
   a notification service configured to send a notification to the mobile device that the mobile device can be used to complete the payment transaction using the mobile payment option.

5. The method of claim 1, further comprising:
   transmitting an instruction to initiate the mobile payment option on the mobile device; and
   receiving a confirmation that mobile payment option has completed a payment transaction, the payment transaction requiring a user authentication on the mobile device.

6. The method of claim 5, wherein the instruction to initiate the mobile payment option on the mobile device includes a confirmation that the user identifier passed a biometric authentication.

7. The method of claim 1, further comprising:
   sending, to the mobile device, information about the payment transaction for display in a checkout interface on the mobile device;
   receiving, from the mobile device, a modification to the payment transaction; and
   receiving another update to the webpage to indicate the modification.

8. The method of claim 1, wherein the request to purchase the product is at least in part an electronic shopping cart.

9. A method of multi-factor authentication of a client device at a commerce server with a mobile device to limit exposure of the client device to security risks, the method comprising:
   identifying, by the commerce server, a user identifier accessing an online store via a webpage rendered on the client device;
   querying, by the commerce server, an identity server to determine that the user identifier is associated with the mobile device and that the mobile device has a mobile payment option that is integrated with the commerce server;

transmitting a first update to the webpage to display a selectable interface element to request to purchase a product via the mobile payment option on the mobile device;

receiving, by the commerce server and from the client device, an instruction to initiate the mobile payment option on the mobile device;

transmitting, to the mobile device, a request to confirm the purchase of the product;

receiving, by the commerce server from the mobile device, a second update to the request to purchase the product;

transmitting a third update to the webpage to display an alteration, requested from the mobile device, to the request to purchase the product; and receiving, by the commerce server and from the mobile device, a confirmation that mobile payment option has completed a payment transaction, the payment transaction requiring a user authentication on the mobile device, whereby the multi-factor authentication of the client device at the commerce server with the mobile device limits exposure of the client device to security risks.

10. The method of claim 9, further comprising:
transmitting another update to the webpage to indicate that the product was purchased.

11. The method of claim 10, further comprising:
receiving a selection at the selectable interface element; and
causing a notification to be sent to the mobile device that the mobile device can be used to purchase the product from the online store.

12. The method of claim 11, wherein the notification is sent via a notification service.

13. The method of claim 11, wherein the notification includes a payment transaction identifier that identifies the payment transaction in the commerce server.

14. The method of claim 11, wherein the mobile payment option is an application associated with the commerce server configured to access the online store.

15. The method of claim 14, wherein the notification includes an application identifier that identifies the application on the mobile device that is associated with the mobile payment option.

16. The method of claim 9, further comprising:
sending, by the commerce server to the mobile device, information about the payment transaction for display in a checkout interface on the mobile device;
receiving, at the commerce server from the mobile device, a modification to the payment transaction; and
transmitting another update to the webpage to indicate the modification.

17. The method of claim 9, wherein the instruction to initiate the mobile payment option on the mobile device includes a confirmation that the user identifier passed a biometric authentication.

18. The method of claim 9, wherein the instruction to initiate the mobile payment option on the mobile device includes a confirmation that the mobile device is designated as a primary device.

19. A system for confirming a user identity of a client device at a commerce server with a mobile device using multi-factor authentication to limit exposure of the client device to security risks, the system comprising:
a processor;
an identity database containing user identity information of the mobile device having a mobile payment option that is integrated with the commerce server; and
a network interface configured to:
send a confirmation, in response to a request to confirm the user identity accessing an online store via a webpage rendered on the client device is the same user identity of the mobile device having the mobile payment option that is integrated with the system;
transmit a first update to the webpage to display a selectable interface element to request to purchase a product via the mobile payment option on the mobile device;
receive a request to perform a payment transaction using the mobile payment option on the mobile device;
transmit a second update to the webpage to display an alteration, requested from the mobile device, to the request to purchase the product from the mobile device; and
transmit a notification that the mobile device can be used to complete the payment transaction using the mobile payment option,
whereby the multi-factor authentication of the client device at the commerce server with the mobile device limits exposure of the client device to security risks.

20. The system of claim 19, wherein the network interface is configured to notify the client device that the mobile device can be used to complete the payment transaction using the mobile payment option by sending the notification along with a payment transaction identifier that identifies the payment transaction in the system.

21. The system of claim 19, wherein the network interface is configured to notify the client device that the mobile device can be used to complete the payment transaction using the mobile payment option by sending the notification along with an application identifier that identifies an application on the mobile device that is associated with the mobile payment option.

22. The system of claim 19, wherein the network interface is configured to notify the client device that the mobile device can be used to complete the payment transaction using the mobile payment option by instructing a notification service to send the notification to the mobile device that the mobile device can be used to complete the payment transaction using the mobile payment option.

23. The system of claim 19, wherein the network interface is further configured to:
receive, from the client device, an instruction to initiate the mobile payment option on the mobile device; and
receive, from the mobile device, a confirmation that mobile payment option has completed a payment transaction, the payment transaction requiring a user authentication on the mobile device.

24. The system of claim 23, wherein the instruction to initiate the mobile payment option on the mobile device includes a confirmation that the user identity passed a biometric authentication.

25. The system of claim 19, wherein the network interface is further configured to:
send, to the mobile device, information about the payment transaction for display in a checkout interface on the mobile device;
receive, from the mobile device, a modification to the payment transaction; and send instructions to update the webpage to indicate the modification.

26. A non-transitory computer-readable storage medium storing instructions for multi-factor authentication of a client device at a commerce server with a mobile device to limit exposure of the client device to security risks which, when executed by the client device, cause the client device to:
  access an online store via a webpage rendered on the client device, wherein the client device is associated with a user identifier, the user identifier being the same user identifier of the mobile device having a mobile payment option that is integrated with the commerce server;
  receive a first update to the webpage to display a selectable interface element to request to purchase a product via the mobile payment option on the mobile device;
  transmit, to the commerce server, a request to perform a payment transaction using the mobile payment option on the mobile device;
  receive a second update to the webpage to display an alteration, requested from the mobile device, to the request to purchase the product from the mobile device; and
  receive a notification that the mobile device can be used to complete the payment transaction using the mobile payment option,
whereby multi-factor authentication of the client device at the commerce server with the mobile device limits exposure of the client device to security risks.

27. The computer readable medium of claim 26, further comprising instructions, which when executed by the client device, causes the client device to receive notification that the mobile device can be used to complete the payment transaction using the mobile payment option by sending the notification along with a payment transaction identifier that identifies the payment transaction in the commerce server.

28. The computer readable medium of claim 26, further comprising instructions, which when executed by the client device, causes the client device to receive notification that the mobile device can be used to complete the payment transaction using the mobile payment option by sending the notification along with an application identifier that identifies an application on the mobile device that is associated with the mobile payment option.

29. The computer readable medium of claim 26, further comprising instructions, which when executed by the client device, causes the client device to receive notification that the mobile device can be used to complete the payment transaction using the mobile payment option by instructing a notification service to send the notification to the mobile device that the mobile device can be used to complete the payment transaction using the mobile payment option.

30. The computer readable medium of claim 26, further comprising instructions, which when executed by the client device, causes the client device to:
  transmit an instruction to initiate the mobile payment option on the mobile device; and
  receive a confirmation that mobile payment option has completed a payment transaction, the payment transaction requiring a user authentication on the mobile device.

31. The computer readable medium of claim 30, wherein the instruction to initiate the mobile payment option on the mobile device includes a confirmation that the user identifier passed a biometric authentication.

32. The computer readable medium of claim 26, further comprising instructions, which when executed by the client device, causes the client device to:
  send, to the mobile device, information about the payment transaction for display in a checkout interface on the mobile device;
  receive, from the mobile device, a modification to the payment transaction; and
  send instructions to update the webpage to indicate the modification.

* * * * *

UNITED STATES PATENT AND TRADEMARK OFFICE
CERTIFICATE OF CORRECTION

PATENT NO. : 10,853,786 B2  
APPLICATION NO. : 14/788315  
DATED : December 1, 2020  
INVENTOR(S) : Massimiliano Mancini Page 1 of 1

It is certified that error appears in the above-identified patent and that said Letters Patent is hereby corrected as shown below:

In the Claims

Claim 5: Column 12, Line 38, delete "that mobile payment" and insert --that the mobile payment--

Claim 9: Column 13, Line 18, delete "that mobile payment" and insert --that the mobile payment--

Claim 23: Column 14, Line 54, delete "that mobile payment" and insert --that the mobile payment--

Claim 30: Column 16, Line 20, delete "that mobile payment" and insert --that the mobile payment--

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*